United States Patent [19]

Voldman

[11] Patent Number: 5,625,280

[45] Date of Patent: Apr. 29, 1997

[54] VOLTAGE REGULATOR BYPASS CIRCUIT

[75] Inventor: Steven H. Voldman, South Burlington, Vt.

[73] Assignee: International Business Machines Corp., Armonk, N.Y.

[21] Appl. No.: 550,423

[22] Filed: Oct. 30, 1995

[51] Int. Cl.$^6$ ............................ H02H 9/00; H02H 3/24
[52] U.S. Cl. .............................. 323/284; 361/91
[58] Field of Search ............... 361/91, 56, 111; 323/284, 291, 292, 311, 349

[56] References Cited

U.S. PATENT DOCUMENTS

| | | | |
|---|---|---|---|
| 4,595,941 | 6/1986 | Avery | 357/43 |
| 4,835,416 | 5/1989 | Miller | 307/296.4 |
| 4,890,187 | 12/1989 | Tailliet et al. | 361/111 |
| 4,918,563 | 4/1990 | Kanai et al. | 361/91 |
| 4,922,371 | 5/1990 | Gray et al. | 361/91 |
| 4,978,867 | 12/1990 | Pfennings | 307/296.6 |
| 4,980,792 | 12/1990 | Kertis et al. | 361/91 |
| 4,982,113 | 1/1991 | Jinbo | 307/465 |
| 5,041,889 | 8/1991 | Kriedt et al. | 307/475 |
| 5,121,007 | 6/1992 | Aizaki | 357/23.13 |
| 5,124,578 | 6/1992 | Worley et al. | 307/443 |
| 5,134,314 | 7/1992 | Wehrmacher | 307/443 |
| 5,189,588 | 2/1993 | Yano et al. | 361/56 |
| 5,239,440 | 8/1993 | Merrill | 361/91 |
| 5,287,241 | 2/1994 | Puar | 361/56 |
| 5,343,352 | 8/1994 | Nagamine | 361/56 |
| 5,345,357 | 9/1994 | Pianka | 361/56 |

*Primary Examiner*—Aditya Krishnan
*Attorney, Agent, or Firm*—Whitham, Curtis, Whitham & McGinn; Howard J. Walter, Jr.

[57] ABSTRACT

An on-chip voltage regulator circuit isolates the chip circuitry from spurious signals and electrostatic discharge (ESD) of peripheral circuitry. A bypass function for the regulator circuit is initiated on detection of the onset of an over voltage condition. In one implementation, a MOSFET is used to (1) initiate a parallel current path from Vcc to Vdd and (2) bypass the regulator to establish a continuous current path from the ESD diode to the Vcc to the Vdd power grid. The circuit addresses level shifting and uses an RC triggering technique.

8 Claims, 5 Drawing Sheets

VOLTAGE REGULATOR BYPASS CIRCUIT

BACKGROUND OF THE INVENTION

1. Field of the Invention

The present invention generally relates to voltage regulators for very large scale integrated (VLSI) circuits, such as dynamic random access memories (DRAMs), static random access memories (SRAMs), and logic circuits, having multi-voltage capability and, more particularly, to a voltage regulator bypass circuit triggered by detection of an onset of an over voltage condition to provide a shunt path to the internal chip capacitance.

2. Background Description

The shrinking of metal, oxide semiconductor field effect transistor (MOSFET) dimensions used in advanced integrated circuit technology for constructing a high circuit density and achieving performance objectives has required reduced power supply voltages. With increased interest in portability, reduced power consumption in complementary metal oxide semiconductor (CMOS) circuits is an important issue. Because power consumption is a function of $CV^2f$, the focus has been on reducing both capacitance, C, and power supply voltage, V, as the transition frequency, f, increases. As a result, dielectric thickness continues to be scaled with the power supply voltage. Power supply reduction continues to be the trend of future low voltage CMOS device scaling in advanced semiconductors. The effect of MOSFET scaling on electrostatic discharge (ESD) protection has manifested itself in three ways: the shrinking of ESD structures and input/output (I/O) circuitry, mixed voltage interface (MVI) chips, and noise isolation versus over voltage tradeoffs.

Today's computer architecture also requires the interfacing of semiconductor chip or subsystems with different internal power supply voltages. The semiconductor chip power supply voltages re different because of the technology generation mix, technology types, and applications. DRAM chips, whose geometrical dimensions are typically the most aggressive, must communicate with other logic and microprocessors. With the mix of power supply voltages, chip-to-chip interface I/O circuitry must be designed to avoid electrical over stress and prevent undesirable current leakage paths that create system level power loss. Lower power supply voltages are driving new bus architectures to isolate peripheral noise from internal core logic.

DRAMs, SRAMs and VLSI logic circuits having multi-voltage compatibility use voltage regulators to lower the externally supplied rail voltage to an internal rail voltage. For example, such circuits may have multiple internal rails for 3 V or 5 V, where the externally supplied voltage Vcc is 5 V and a voltage regulator is used to lower this voltage to 3 V for the internal supply voltage Vdd. For 3.3 V/2.5 V systems, the external power Vcc is at 3.3 V and 2.5 V Vdd is defined by the regulator circuit.

ESD networks are typically connected to the external power rail Vcc using diode-based ESD networks. The internal power rail Vdd is biased by the Vcc power rail. In an over voltage event (electrical over-stress (EOS) or electrical discharge (ESD)), the current flows to the Vcc power supply. Since the capacitance of the Vcc power rail is small (on the order of a nano Farad (nF) or less), the Vcc power rail is charged to a high voltage.

In this process, multiple problems can occur. First, the I/O circuitry over voltage destruction occurs. The I/O circuitry MOSFET source and drain electrically overload because of MOSFET secondary breakdown. In receiver structures, the MOSFET gate dielectric is ruptured due to dielectric thermal breakdown. These processes are well understood. In the development of a 16 megabyte (MB) DRAM, a p-type, p-channel MOSFET regulator circuit was used and placed between the Vcc and Vdd power rails. It was discovered by the inventor of the invention described herein that the I/O driver ESD robustness results were low. The I/O circuitry n-channel MOSFET source and drain electrically overloaded because of MOSFET secondary breakdown. The electrical overload occurred since the electrical current could not flow from the Vcc power rail to the Vdd power rail. The p-channel MOSFET source implant did not forward bias since the n-well of the p-channel MOSFET was connected to the Vcc power rail. The Vdd power rail was preferred since it has a large capacitance to the chip substrate ground plane. Hence, a desired solution to establish a function of the regulator to allow current to bypass in an EOS/ESD event.

A second issue is the over voltage of the voltage regulator circuit itself. In the development of a 16 MB DRAM, an n-type, n-channel MOSFET regulator circuit was used and placed between the Vcc and Vdd power rails. In the simulated human body model (HBM) positive ESD test impulse mode, the inventor of the invention described herein discovered the n-channel transistor of the voltage regulator was destroyed due to electrical overload. The electrical overload occurred since the electrical current flowed from the Vcc power rail to the internal Vdd power rail. The Vdd power rail was preferred since it has a large capacitance to the chip substrate ground plane. To prevent the electrical overload of the voltage regulator circuit, the ESD requirements may force the normal operational function of the n-channel transistor to be much larger than desired for function operations due to both current drive and physical space. Hence, a desired solution to prevent MOSFET secondary breakdown in the voltage regulator is necessary. Further, a desired solution to establish a function of the regulator to allow current to bypass in an EOS/ESD event and prevent electrical destruction of the voltage regulator critical circuits. A second electrical over stress impulse is a charge device model (CDM) impulse. A solution is needed to allow current to pass from the Vdd power rail to the Vcc power rail to the output nodes. In the CDM mechanism, the package substrate is charged to a positive or negative polarity and electrically isolated. The charged package is then discharged through the package external pins. Hence, a desired solution to establish a function of the regulator to allow current to bypass in an EOS/ESD event and prevent electrical destruction of the voltage regulator critical circuits.

The broad concept to allow current flow from one power rail to another is known. For example, in U.S. Pat. No. 5,079,612 to Takamoto et al., a subcircuit block is defined between separated Vcc power rails and Vss chip substrate rails. The intent is to make a short circuit through at least between one or two ground lines. Grounded gate n-channel transistors are used. In this implementation, there are no active elements to be protected between the Vcc power rails or between the Vss power rails.

In U.S. Pat. No. 5,124,877 to Graham, the technique of a discharge rail is disclosed. In this case, a bus is defined which has no voltage reference potential. In this application, only a single power supply voltage at the value of the value of the internal power rail Vdd is provided. The discharge rail is not connected to a second power supply. Additionally, there is no active circuitry between the first and second rails. Hence, there is no concern of a differential voltage between Vcc and Vdd when the chip is powered off.

The concept of gate coupling and triggerable circuits have been discussed between Vdd and ground Vss. In U.S. Pat. No. 4,423,431 to Sasaki, the technique of gate coupling on a MOSFET for ESD is disclosed. A resistor is placed in series with a receiver circuit. The resistor is followed by an n-type FET (NFET) connected between the input node and ground. The gate of the transistor is connected to the input node via a capacitor. In this implementation, the ESD impulse triggers the NFET via capacitance coupling, the ESD device being placed between the input node and ground.

In U.S. Pat. No. 5,255,146 to Miller, a pulse time network, on-time network and rise time network is used to feed a signal into an FET to establish a current discharge between Vdd and Vss chip substrate. In U.S. Pat. No. 5,287,241 to Puar et al., dynamic triggering is achieved between Vdd and Vss chip substrate by having an resistor/capacitor (RC) network turn on a p-type FET (PFET) placed between the two power rails. In U.S. Pat. No. 5,311,391 to Dungan et al., dynamic triggering is achieved using FETs in a diode-connected string between the Vdd and Vss electrodes. This diode-connected string acts as a level shifting network to initiate an RC network to turn on a MOSFET between Vdd and Vss. In U.S. Pat. No. 5,239,440 to Merrill, dynamic triggering is achieved using an RC network followed by two inverter stages and ESD logic which turns on the I/O buffers. In U.S. Pat. No. 5,237,395 to Lee, dynamic triggering is achieved between Vdd and Vss chip substrate by having an RC network turn on an NFET in series with a resistor placed between the two power rails. All of the above, pertain to the concept of triggerable ESD networks between the Vdd and Vss chip substrate to discharge to the ground plane. None of the above art addresses the case of multiple Vdd supplies and/or regulated environments where there is active circuitry between the Vcc and Vdd power rails where the Vdd is not connected to the external pin environment.

U.S. Pat. No. 4,853,416 describes the case where a regulator exists within the power grid structure of a semiconductor chip. In this case, the solution was not to allow current to flow into the internal Vdd power grid. A switch that is normally open is turned off when an over voltage event is sensed, thereby isolating the sensitive circuitry from the over voltage with the switch control provided by the inverter. This circuit avoids electrical overload to the voltage regulator and overload of the circuitry beyond the regulator. The Miller circuit uses resistor elements and a PFET to block the current to the regulated area.

SUMMARY OF THE INVENTION

It is therefore an object of the present invention to provide an on-chip voltage regulator circuit which isolates the chip circuitry from spurious signal and ESD of peripheral circuitry.

It is another object of the invention to provide an on-chip regulator circuit which provides a bypass function for the regulator circuit which is initiated on detection of the onset of an over voltage condition.

According to the invention, a MOSFET is used to (1) initiate a parallel current path from Vcc to Vdd and (2) bypass the regulator to establish a continuous current path from the ESD diode connected to the Vcc rail to the Vdd power grid. The circuit addresses level shifting and uses an RC triggering technique. The circuit avoids electrical over stress of the regulator, allows current passage from Vcc to Vdd and establishes ESD robustness on the chip I/O circuitry. The invention has two functional aspects. The first function defines the second voltage value Vdd from the first power supply voltage Vcc via active chip circuitry consisting of MOSFETs. The second function provides both triggerable and non-triggerable overload protection of the regulator, allows a current bypass between the supplied power Vcc and the second regulated voltage Vdd, and is electrically triggered from the supplied voltage rail Vcc. This second function serves to limit the differential voltage between the Vcc and Vdd rails to prevent electrical overload and reduce the total voltage differential between the two power rails allowing a higher current flow from the input node back to the ground chip substrate via the Vcc and Vdd current path. A second solution is to allow the main transistors in the regulator to be in an "on" state during an ESD impulse. This can be achieved using the ESD impulse to apply a signal to the logic circuitry of the regulator circuit as a parallel input.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
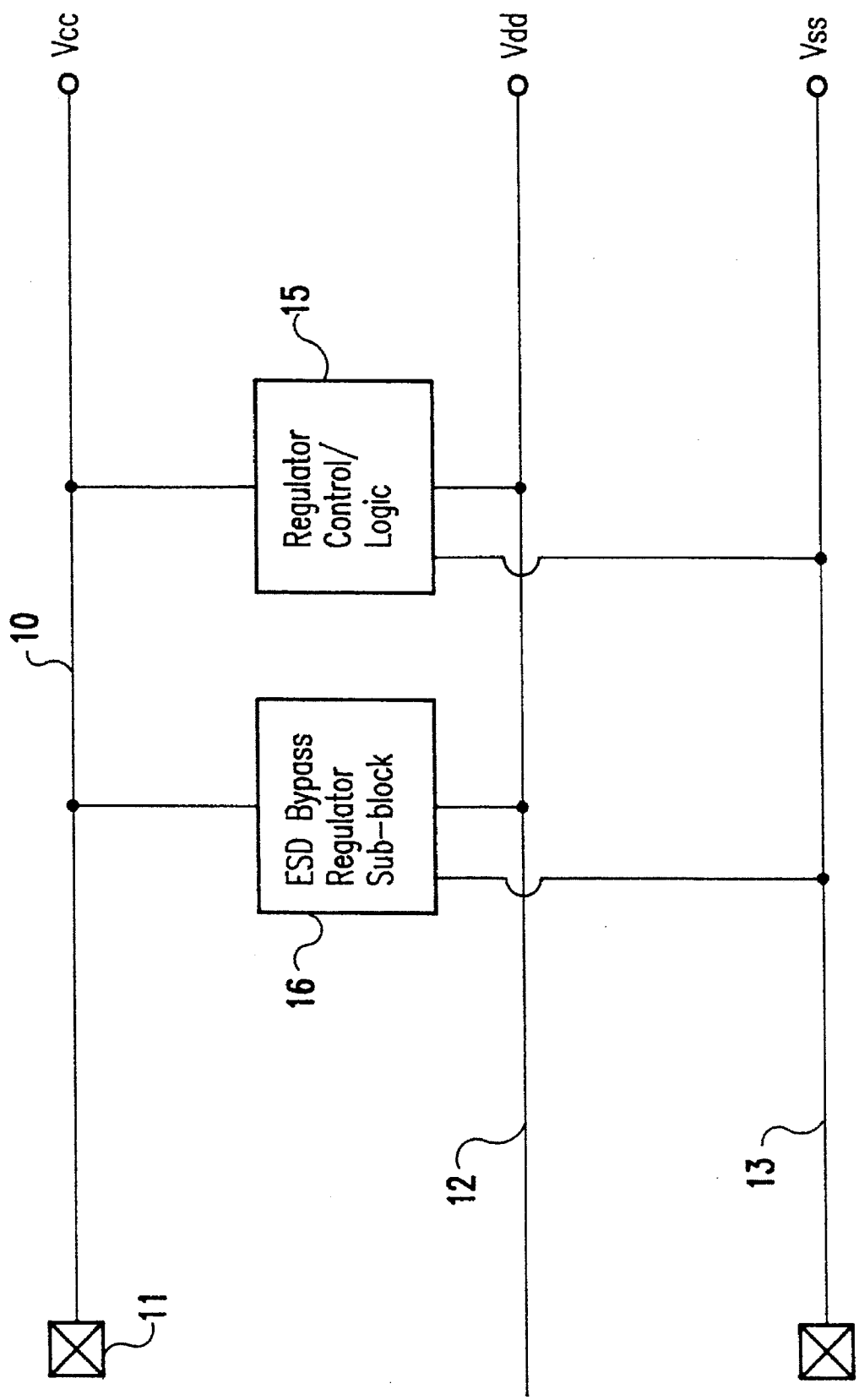
FIG. 1 is a functional block diagram of the regulator, the voltage supplied power rail Vcc and the regulated rail Vdd defining the regulation sub-block and the overload sub-block.

Referring now to the drawings, and more particularly to FIG. 1, there is shown a functional block diagram of the voltage regulator bypass circuit according to the invention. In FIG. 1, the elements shown are the Vcc power rail 10 connected to a metal pad 11 and an external pin where power is supplied to the chip, the Vdd power rail 12, and the Vss chip ground plane 13. The Vdd power rail 12 is not connected to an external pin. A regulator 15 controls the regulation of voltage of Vdd relative to Vcc. The voltage regulator 15 can be an n-channel transistor or a p-channel transistor placed between the Vcc power rail 10 and the Vdd rail 12. An overload sub-block 16 detects overload conditions.

Figure 2:
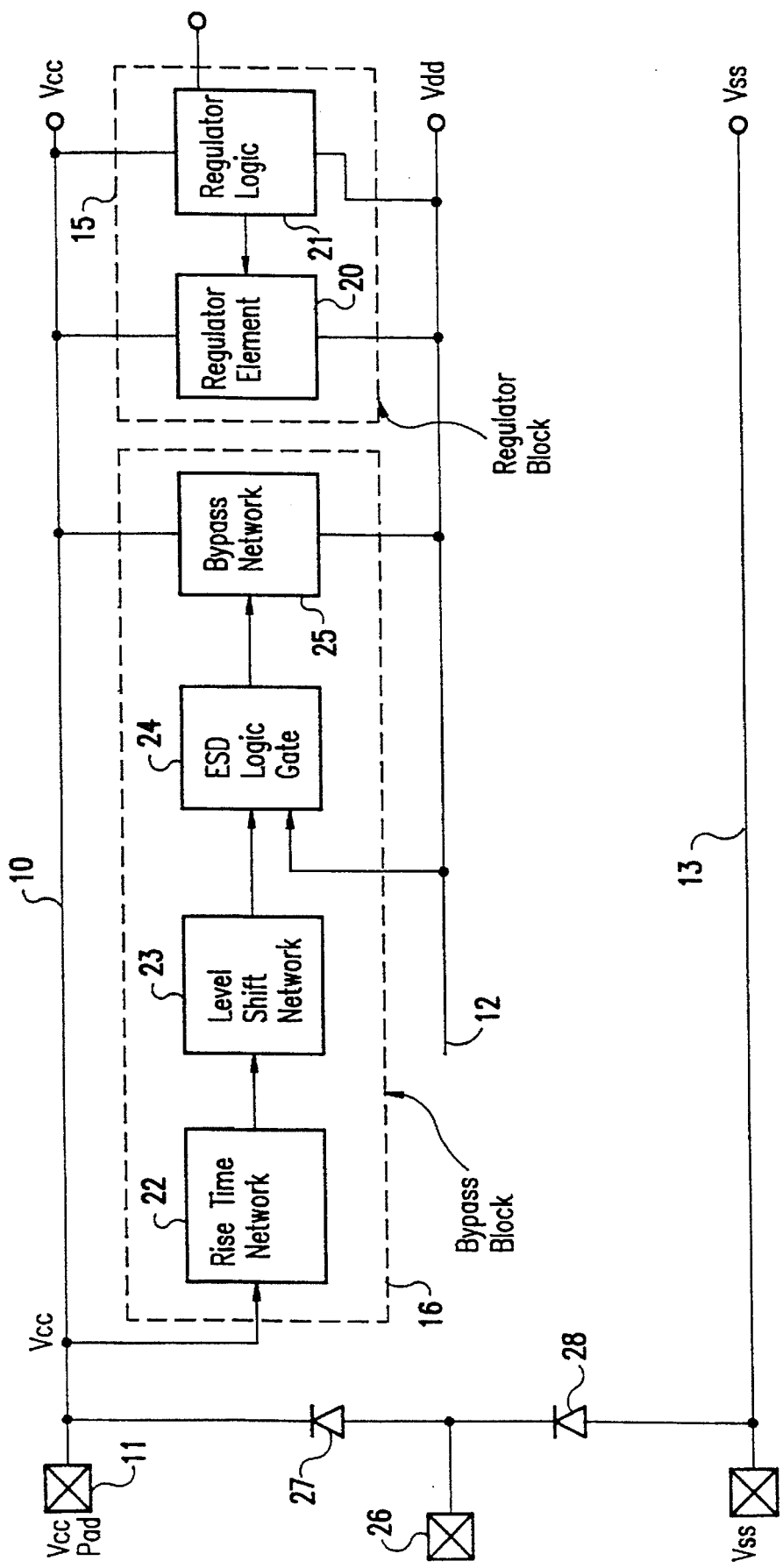
FIG. 2 is a functional block diagram of the regulation sub-block, and sub-elements of the overload sub-block, consisting of a rise time network, a Vcc-to-Vdd level shift network, ESD logic gates and discharge element.

FIG. 2 shows in more detail the regulator 15 and the overload sub-block 16. The basic components of the regulator 15 are a regulator element 20 connected between the Vcc rail 10 and the Vdd rail 12 and regulator logic 21 which controls the regulator element 20. The overload sub-block 16 includes a rise time network 22 which is connected to the Vcc rail 10 and serves to allow an ESD/DES impulse to activate the logic for time scales consistent with over voltage and ESD impulse time scales but remains inactivated in the case of power-up of the chip. The output of the rise time network 22 is supplied to the Vcc-to-Vdd level shift network 23 which allows the ESD impulse to activate the logic gates and reduce the voltage applied to prevent electrical overload of the networks. The output of the level shift network 23 is supplied to an ESD logic gate 24 which also receives an input from the Vdd rail 12. The purpose of the logic gate 24 is that when the chip is powered-up, the logic supplies a signal that deactivates the turn-on of the bypass network 25 connected between the Vcc rail 10 and the Vdd rail 12. An external voltage is applied to pad 26 which is isolated from an internal Vcc rail 10 and an internal circuit ground rail Vss 13 by diodes 27 and 28, respectively. Diodes 27 and 28 are an example of a preferred ESD network applied to an input pad 30.

According to the invention, a detection circuit is provided to detect the onset of an over voltage condition. This detection circuit includes the rise time network 22 connected across the Vcc rail 10 and the Vss ground rail 13. At steady state, the output of the rise time network is Vcc. This output will rise should the voltage on the Vcc rail 10 increase. The rise time network 22 has a predetermined time delay, and its output is applied to level shifter 23 which is designed to provide voltage level shift from Vcc to Vdd.

Figure 3:
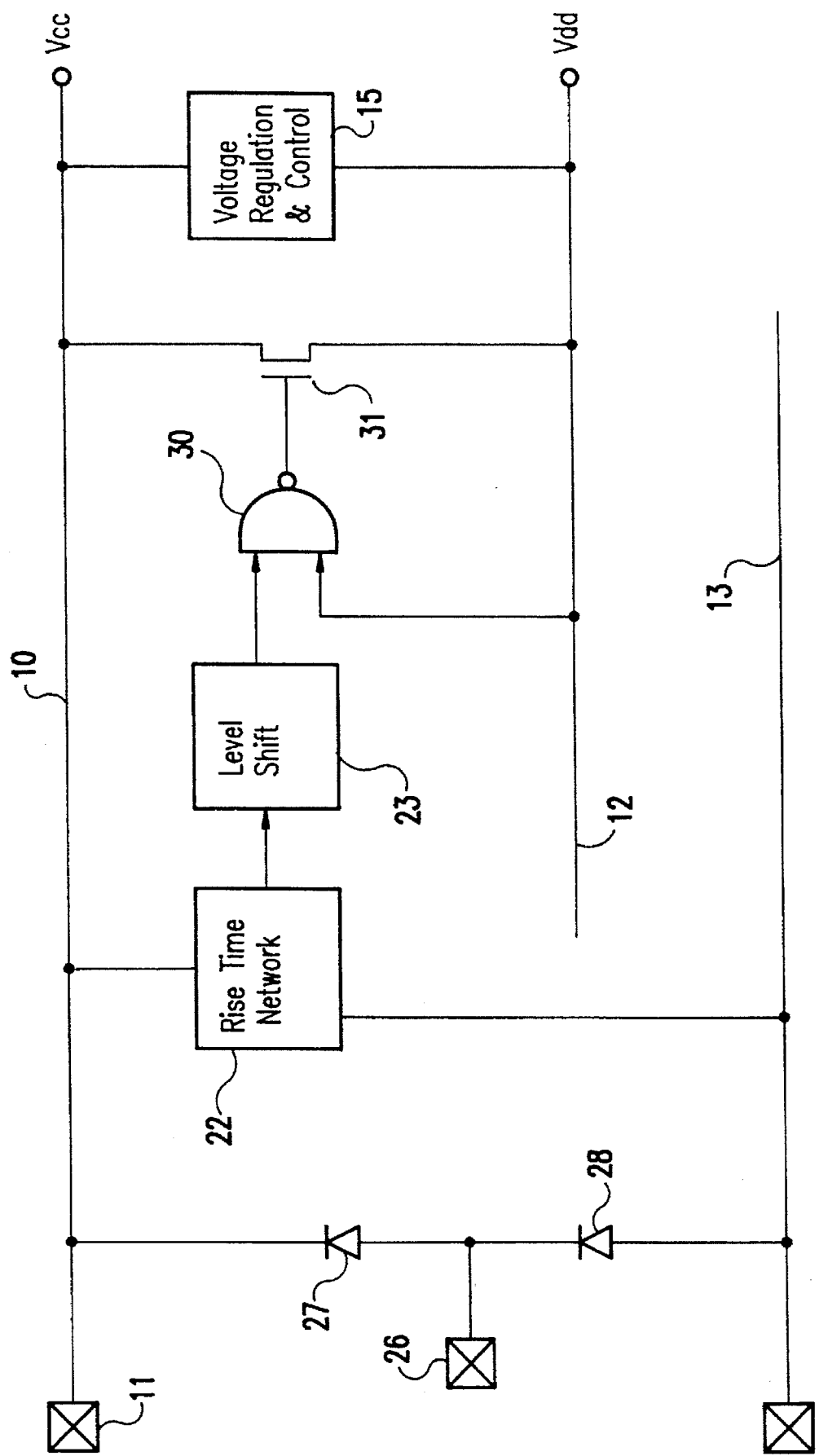
FIG. 3 is a schematic diagram showing the power rail Vcc and the regulated rail Vdd, Vss chip substrate ground plane, ESD network at the input pad, the regulation sub-block, and the overload sub-block highlighting the rise time network, Vcc-to-Vdd level shift circuit, and a two-input NAND gate whose input is connected to Vdd in an NFET implementation.

In FIG. 3, the ESD logic gate 24 is shown as a two-input NAND gate 30, and the bypass network 25 is shown as an FET device 31 connected between the Vcc rail 10 and the Vdd rail 12 and having its gate connected to the output of NAND gate 30. The bypass network must serve the function of a circuit element that allows current to flow in a unidirectional or bidirectional fashion to the Vdd capacitor and is normally "off" during circuit operation. The preferred implementation is to use an n-channel MOSFET whose gate is biased by a logic gate. Specifically, the NAND gate 30 is used to apply the bias voltage to the gate of the FET 31.

Figure 4:
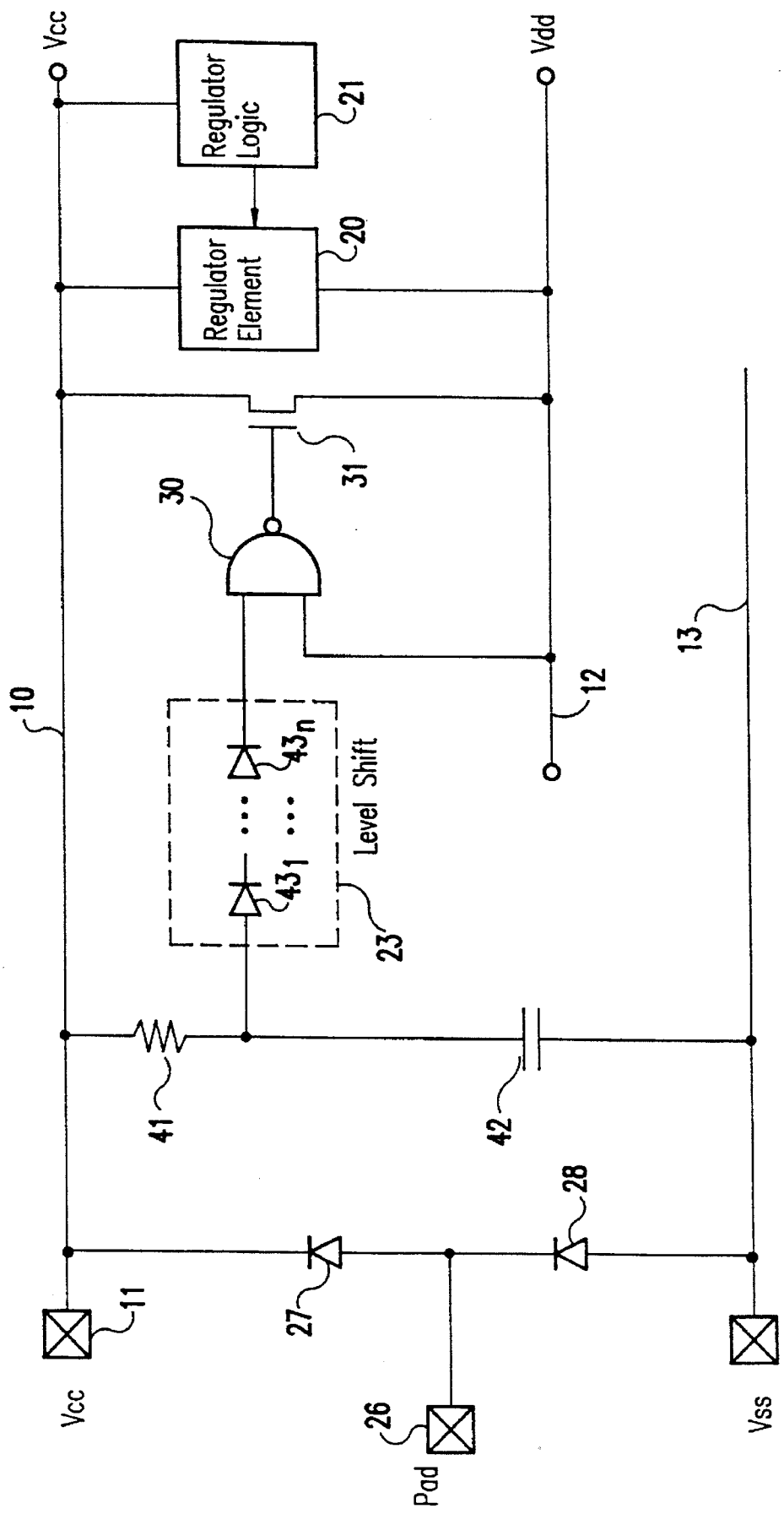
FIG. 4 is a schematic diagram showing the voltage supplied power rail Vcc and the regulated rail Vdd, Vss chip substrate ground plane, ESD network at the input pad, input pad, the regulation sub-block and the overload sub-block highlighting a specific rise time RC network, a level shift circuit consisting of diodes, and a two-input NAND gate whose input is connected to Vdd in an NFET implementation.

FIG. 4 shows a specific implementation of the invention in which the rise time network 22 is composed of resistor 41 and capacitor 42 connected in series between the Vcc rail 10 and the internal ground Vss ground rail 13. The values of the resistor 41 and the capacitor 42 are chosen to provide a predetermined time constant. The resistor 41 can consist of any VLSI element, such as a MOSFET, source/drain implant, well or any other resistor elements. The capacitor 42 can consist of any VLSI element, such as a MOSFET, source/drain implant, well, decoupling capacitor or any other capacitor element. The level shift network 23 is shown as comprising a plurality of diodes $43_1$ to $43_n$ connected in series between the junction of resistor 41 and capacitor 42 and the input of the NAND gate 30. The level shift is accomplished by the cumulative voltage drops provided by each of the diodes connected in series. The diodes $43_1$ can consist of any VLSI element, such as a MOSFET, bipolar transistor, wells or any p-n junction in a diode configuration.

At power up, the logic values of both Vdd and the output of level shift circuit 23 are logic "1 s". Thus, the output of the NAND gate 30 is a logic "0", biasing the NFET 31 "off". When the chip is powered "off", Vdd is a logical "0". When an ESD impulse is applied to input pad 26, the ESD current is passed to the power rail Vcc 10 via the ESD diode 27. The current charges up the Vcc power rail 10 placing a positive voltage on resistor element 41. The plurality of diode elements $43_i$ are forward biased, changing the input of the NAND gate to a logic "1". The rise of the voltage on the Vcc power rail 10 powers up the NAND gate 30. This turns on the NFET 31 causing the current to flow to the chip substrate through all the internal capacitances of the semiconductor chip. This prevents overcharging of the Vcc rail 10 and provides ESD protection of the on-chip circuitry.

In this embodiment, delay stages can be added between the level shifting circuit 23 and the NAND gate 30. These delay stages can be simple CMOS inverter stages connected between the Vcc rail 10 and the Vss ground rail 13. Also, a p-channel device can be placed between the Vcc and Vss rails instead of the NFET 31, in which case the logic state must be changed so that the p-channel device is in an "off" mode in normal operation and in an "on" mode when an ESD impulse occurs.

Figure 5:
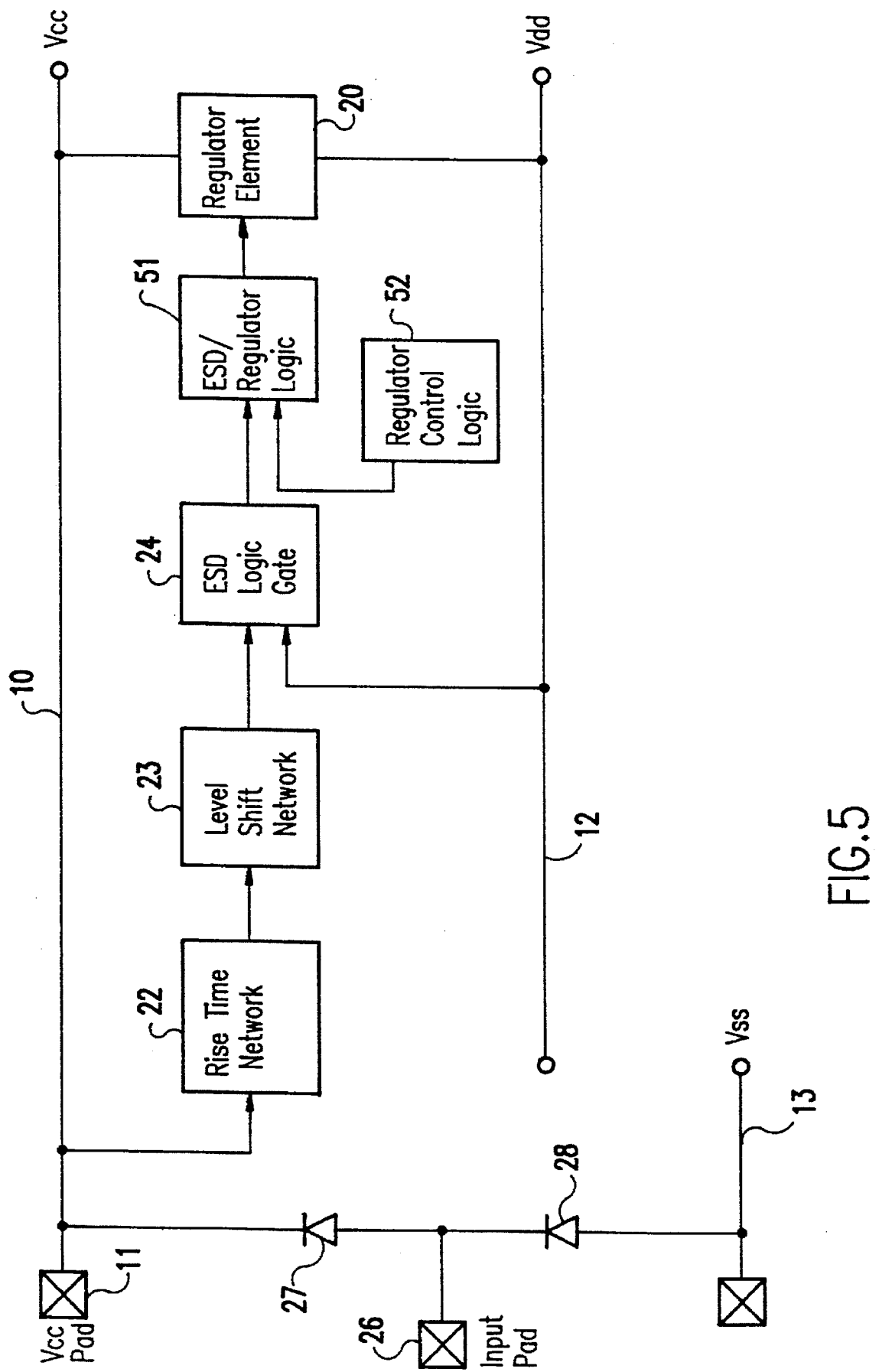
FIG. 5 is a block diagram of a second embodiment of the invention showing a regulator control logic block, rise time network, delay elements, voltage shifter block, logic for bypass and regulation, and a bypass/regulation transistor.

FIG. 5 shows a second embodiment of the invention where only one block 20 of the regulator 15 exists. The key element that controls voltage regulation is the regulation block 51, which may be an n-channel transistor similar to NFET 31. In this case, an additional logic gate 52 follows the ESD logic gate 24. Alternatively, the two logic gates 24 and 52 may be combined as a three-input NAND gate so that when the chip is powered up, the ESD triggerable modes do not influence normal circuit operation. Thus, when Vdd is low and Vcc is high, a signal is passed from the regulator control logic 52 to allow turn on of the n-channel device comprising the regulator 51.

While the invention has been described in terms of two preferred embodiments with various modifications, those skilled in the art will recognize that the invention can be practiced with modification within the spirit and scope of the appended claims.

Having thus described my invention, what I claim as new and desire to secure by Letters Patent is as follows:

1. A regulator circuit for a multi-voltage compatible integrated circuit chip comprising:

a first power rail connected to an externally supplied voltage Vcc;

a second power rail internal to said integrated circuit chip, a regulated voltage Vdd being applied to said second power rail where Vdd is less than Vcc;

a third power rail internal to said integrated circuit chip, said third power rail being a ground voltage Vss;

a voltage regulator connected between said first and second power rails for lowering the voltage Vcc on said first power rail to a required voltage Vdd on said second power rail; and an electrically triggered bypass network connected between said first power rail and said second power rail, said bypass network detecting an onset of an over voltage condition on said first power rail and bypassing said voltage regulator by providing a shunt current path from said first power rail to said second power rail, said electrically triggerable bypass network comprising a rise time network connected to said first power rail for generating a first delayed output voltage level;

a level shift network responsive to said first delayed output voltage level for generating a first logic level;

a logic gate connected to receive as inputs said first logic level and the second power rail, said logic gate generating a control output; and a bypass network connected between said first and second power rails and controlled by said control output for providing a shunt path from said first power rail to said second power rail.

2. The regulator circuit recited in claim 1 wherein said bypass network is a MOSFET device connected between said first and second rails and having a gate biased by said control output of said logic gate.

3. The regulator circuit of claim 1 wherein said rise time network is an RC network comprises a resistor element connected in series with a capacitor element between said first and third power rails, and said voltage shift network comprises a plurality of diode elements connected in series between a junction of said resistor element and said capacitor element and an input of said logic gate, a combined voltage drop of said diode elements providing a Vdd level shift.

4. The regulator circuit recited in claim 2 wherein said MOSFET device is an n-channel device and said logic gate is a NAND gate.

5. The voltage regulator circuit recited in claim 2 wherein the voltage regulator comprises:

a regulator element connected between said first and second power rails and regulates the voltage Vdd from the voltage Vcc; and regulator logic connected between said first and second power rails for controlling said regulator element.

6. The regulator circuit recited in claim 2 wherein said MOSFET device serves as said regulator element, said circuit further comprising a second logic gate having as inputs said control output of the first mentioned logic gate and said regulator logic.

7. The regulator circuit recited in claim 6 wherein said first and second logic gates are implemented by a single three-input logic gate.

8. The regulator circuit recited in claim 7 wherein said MOSFET device is an n-channel device and said logic gate is a NAND gate.

* * * * *